Figure 1:
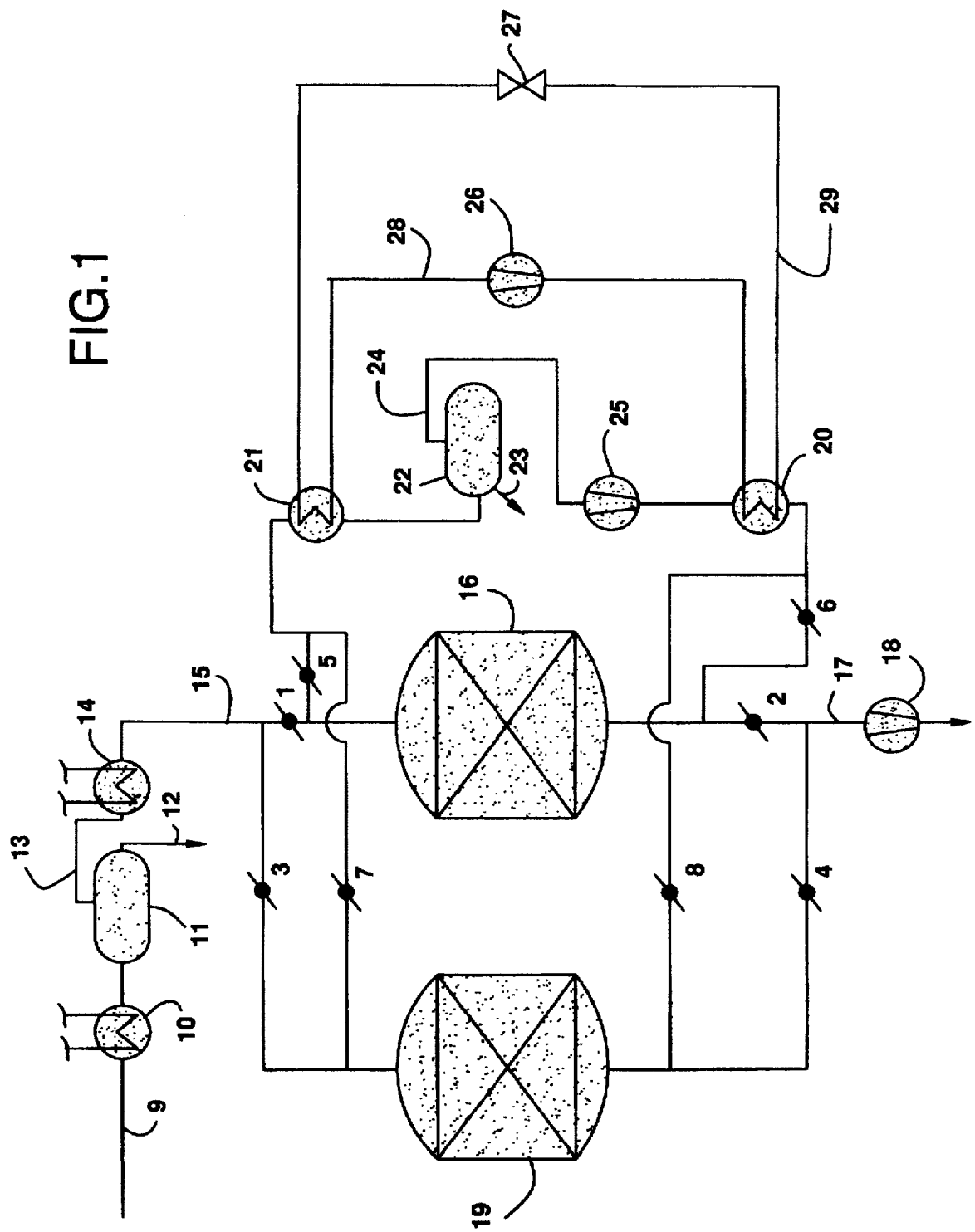

United States Patent [19]

Brück et al.

[11] Patent Number: 5,759,236
[45] Date of Patent: Jun. 2, 1998

[54] ENERGY-SAVING PROCESS FOR THE SEPARATION OF ORGANIC COMPOUNDS FROM GASES

[75] Inventors: Heinrich Thomas Brück, Hennef/Sieg; Leo Vondenhoff, Schorndorf; Michael Hoffmeister; Torsten Schmidt, both of Hanover, all of Germany

[73] Assignee: Engelhard Process Chemicals GmbH, Iselin, N.J.

[21] Appl. No.: 656,282

[22] PCT Filed: Nov. 15, 1994

[86] PCT No.: PCT/EP94/03780

§ 371 Date: May 17, 1996

§ 102(e) Date: May 17, 1996

[87] PCT Pub. No.: WO95/14523

PCT Pub. Date: Jun. 1, 1995

[30] Foreign Application Priority Data

Nov. 22, 1993 [DE] Germany .................. 43 39 667.4

[51] Int. Cl.⁶ .................................................. B01D 53/04
[52] U.S. Cl. .................. 95/41; 95/115; 95/143; 95/901; 96/122; 96/128; 96/130; 96/146
[58] Field of Search .................. 95/41, 104–106, 95/114, 115, 141–147, 901; 96/121, 122, 126–128, 130, 133, 136, 140, 141, 144, 146

[56] References Cited

U.S. PATENT DOCUMENTS

| 3,237,378 | 3/1966 | Garbarini | 95/143 X |
|---|---|---|---|
| 3,626,671 | 12/1971 | Ebeling, Jr. | 96/126 |
| 3,734,293 | 5/1973 | Biskis | 96/126 X |
| 3,850,592 | 11/1974 | Huffman | 96/126 X |
| 4,056,369 | 11/1977 | Quackenbush | 95/115 X |
| 4,336,159 | 6/1982 | Winter | 95/141 X |
| 4,414,003 | 11/1983 | Blaudszun | 96/130 X |
| 4,421,532 | 12/1983 | Sacchetti et al. | 95/104 |
| 4,793,143 | 12/1988 | Rhodes | 95/115 X |
| 4,795,735 | 1/1989 | Liu et al. | 95/143 X |
| 4,933,159 | 6/1990 | Nowack et al. | 95/143 X |
| 5,421,860 | 6/1995 | Bretz et al. | 95/115 |
| 5,536,302 | 7/1996 | Golden et al. | 95/901 X |

FOREIGN PATENT DOCUMENTS

| 0203323 | 12/1986 | European Pat. Off. |
| 0381002 | 8/1990 | European Pat. Off. |
| 0570847 | 11/1993 | European Pat. Off. |
| 2464744 | 3/1981 | France |
| 3824046 | 2/1990 | Germany |
| 4136776 | 5/1993 | Germany |

OTHER PUBLICATIONS

H. Kohler et al., "Aktivkohleadsorptionsanlagen zur Abscheidung von Chlorkohlenwasserstoffen", STAUB Reinhaltung der Luft–Band 46 (1986) Nr.2 Feb. pp. 50–55.

*Primary Examiner*—Robert Spitzer

[57] ABSTRACT

A process for separating organic compounds, such as solvents, from gases, e.g. waste gases of paint shops. The gases to be treated are conducted in an adsorber over a sorbent which is composed of particulate activated carbon in an oxidic carrier. The charged sorbent is regenerated by passing therethrough, preferably according to the counter-current principle, a heated regeneration gas, the regeneration gas charged with desorbate is cooled so that organic compounds condense and can then be separated, whereupon the regeneration gas is reheated and reused for the desorption of the charged sorbent. Heating of the regeneration gas as well as cooling of the regeneration gas charged with desorbate are, at least partially, effected by a heat pump. It will be expedient to provide at least two adsorbers which are charged and regenerated alternately. An apparatus for carrying out the process is additionally described.

17 Claims, 1 Drawing Sheet

ENERGY-SAVING PROCESS FOR THE SEPARATION OF ORGANIC COMPOUNDS FROM GASES

The present invention regards an energy-saving process for separating organic compounds from gases, wherein the gases to be treated are passed in at least one adsorber over a sorbent.

As described in German patent application ... (P 42 16 867.8) and the equivalent European patent application having filing number 93 10 7797.8, organic compounds can be separated from gases by means of a sorbent comprising particulate activated carbon in an oxidic carrier. The organic compounds can be desorbed from the charged sorbent, for instance, by passing therethrough a regeneration gas under heating.

The publication "Staub Reinhaltung der Luft, Vol. 46 (1986), February, No. 2 (Düsseldorf, Germany)", describes an adsorption process for recovering organic compounds from waste gases. The waste gases which contain organic impurities are passed over an adsorber containing activated carbon, whereby the organic compounds are adsorbed by the activated carbon. The purified waste gases are then discharged into the environment. The activated carbon is regenerated by passing a regeneration gas (water vapor or a hot inert gas) through the activated carbon. The organic compounds are subsequently recovered by cooling the regeneration gas. The heat exchanger which is used for heating the regeneration gas before the gas is supplied to the adsorber, and the heat exchanger which is used for cooling the regeneration gas after the gas has left the adsorber are interconnected via a heat pump.

It is the object of the present invention to provide a process for separating organic compounds from gases, which process can be performed in an especially energy-saving manner. This object is achieved according to the invention with a process for separating organic compounds from gases, the gases to be treated being passed in at least one adsorber (16, 19) over a sorbent, wherein the sorbent is charged with organic compounds and the gas freed from the organic compounds can be discharged into the environment, and the charged sorbent is regenerated by passing therethrough a heated regeneration gas, the regeneration gas charged with desorbate being cooled, so that organic compounds condense and can be separated, heating of the regeneration gas prior to passing the gas through the sorbent as well as cooling of the regeneration gas charged with desorbate being carried out at least partially by heat exchangers (20, 21) connected by a heat pump (26, 27, 28, 29), characterized in that the sorbent comprises particulate activated carbon in an oxidic carrier.

In case water is present in the gas to be treated, it can also be separated.

Preferred sorbents comprise activated carbon and a carrier based on silicon dioxide, aluminum oxide, aluminum phosphate or aluminosilicate.

The regeneration gas is preferably circulated.

Hence, the invention is seen in the features that the above-mentioned special sorbent is used and that both heating of the regeneration gas and cooling of the regeneration gas are carried out at least partially by a heat pump. The principle of a heat pump is known: A heat pump medium (such as $NH_3$, low-boiling hydrocarbons or halogenated hydrocarbons) is compressed in a pump (compressor). The heated operating medium serves to heat the regeneration gas in a heat exchanger. The operating medium of the heat pump which has cooled down during heat exchange is expanded via a throttle, whereby it is cooled even further. The coolant cooled in this manner is contacted in a heat exchanger for cooling the regeneration gas charged with the desorbate from the adsorber to be regenerated. The operating medium is heated and further compressed in the pump (compressor). It is thus heated to an even stronger degree, flows again through the heat exchanger for the purpose of heating the desorbate-free regeneration gas, it is cooled, expanded via the throttle and cooled further, it then cools the desorbate-charged regeneration gas in the heat exchanger, etc.

The regeneration gas can further be heated with the aid of an external heating system in addition to heating by the operating medium of the heat pump; it is also possible to cool the desorbate-charged regeneration gas with other cooling media in addition to cooling by the operating medium of the heat pump.

The regeneration gas can here be heated to a temperature range of from 60° C. to about 250° C. or even more. According to a preferred embodiment, however, the whole amount of energy required for heating the regeneration gas is supplied by the heat energy of the operating medium of the heat pump prior to passage through the adsorber to be regenerated. In this case, heating is expediently performed up to a temperature of about 80° C., preferably of about 60° C. to 80° C. Surprisingly enough, the special sorbent comprising activated carbon in an oxidic carrier can already be desorbed at such low temperatures. Hence, the combination of the sorbent with a heat pump for preheating the regeneration gas and for cooling the regeneration gas, respectively, is not a mere aggregation, but a genuine combination of two measures that mutually influence one another.

The desorbate-charged regeneration gas is advantageously cooled down to a temperature in the range below 10° C., preferably to a temperature in the range of from 0° C. to −50° C., cooling of the regeneration gas being entirely effected by the heat pump.

It has turned out to be advantageous that, when the gas to be treated is passed through the sorbent, the pressure, the volume flow and/or the temperature of the gas to be treated are varied. For instance, the pressure can be varied in pulsating fashion in a range of from 50 to 150 kPa (0.5 to 1.5 atm), the volume flow in a range of from 0.5 to 1.5 times the standard air flow of the respective device size in a range of from +/−20° K. around the calculated operating temperature.

Within the scope of the present invention, the term "activated carbon" includes activated-carbon black, activated-carbon coke and graphite, but no activated-carbon molecular sieve.

The particle size of the activated carbon should expediently be in the range of from 50 to 50,000 nm. It is preferably in the range of from 50 to 10,000 nm.

The content of activated carbon in the sorbent can vary within a wide range, for instance between 0.1 and 90% by wt., based on the total weight of the sorbent. The content is preferably between 0.5 and 70% by wt., in particular between 5 and 40% by wt.

A uniform homogeneous distribution of the activated carbon is especially advantageous. However, it is also possible to use sorbents coated with activated carbon.

Amorphous and/or crystalline material can be used as the oxidic carrier. Amorphous oxidic carriers which may contain crystalline material are very well suited. Amorphous oxidic carriers based on $SiO_2$ or aluminosilicate, especially $SiO_2$, are especially well suited for use in the process of the invention.

If crystalline components, such as zeolite or aluminum phosphate, are contained, their amount is advantageously in the range of from 0.5 to 50% by wt., based on the total weight of the sorbent. The pore width of the amorphous oxidic material is advantageously in the range of from 1 to 10,000 nm.

The sorbent can be present in any desired form, for instance as a granular material, extrudate, monolith. It is expediently present in particles of a size having at least 0.1 mm. A sorbent that is beaded is especially preferred. The diameter of these beaded particles is expediently in the range of from 0.5 to 10 mm, preferably 1 to 6 mm. Sorbents which are formed differently may also be used.

The temperature at which sorption of the organic components of the gas to be treated is performed is between −70° C. and the desorption temperature, preferably in the range between 0° C. and 30° C.

It is possible to work at a normal pressure (ambient pressure), but also at a negative pressure, e.g. down to 0.1 mbar, or at an excess pressure up to 50 bar.

With the process of the invention, it is also possible to remove those substances from gases that can be absorbed by means of activated carbon, as is generally known. It can optionally be determined by simply contacting a gas and through a subsequent analysis whether a specific organic substance can be absorbed. Polar and non-polar, gaseous or vaporous organic substances can be removed. In particular, gases and vapors of organic compounds which can be used as solvents can be removed. For instance, substances can be absorbed which are only composed of carbon and hydrogen, for instance, aliphatic or cycloaliphatic hydrocarbons, for instance gasoline, or aromatic hydrocarbons, such as benzene, toluene, or xylene. It is also possible to absorb compound classes which contain carbon and heteroatoms, such as nitrogen, oxygen, halogen atoms, sulfur, phosphorus and, possibly, hydrogen. For instance, it is possible to remove halogenated carbons, halogenated hydrocarbons, such as chlorinated carbons, chlorinated hydrocarbons, chlorofluorocarbons, hydrogen chlorofluorocarbons, fluorocarbons, hydrogen fluorocarbons, alcohols, ketones, carboxylic acid esters, aldehydes, aliphatic cycloaliphatic or aromatic ethers, alkyl phosphorus compounds, alkyl sulfur compounds. As follows from the above, it can be assumed that any desired organic substance can be absorbed, on condition it is present in gaseous or vaporous form.

It is recommended that working conditions which lead to the destruction of the carrier be absent.

In particular, aromatic hydrocarbons such as benzene, toluene or xylene, are absorbed in a highly efficient manner.

For instance, it is possible to treat waste gases following from production processes in which such organic compounds are produced or used as starting compounds or solvents, e.g. also outlet air from paint shops, printing shops, or other industrial waste gases.

Processes for the production of very easily applicable sorbents will now be indicated. The production of oxidic materials based on amorphous or crystalline $SiO_2$, $Al_2O_3$, aluminum phosphate or aluminosilicate is known to a person skilled in the art. Crystalline aluminosilicate, for instance, can be produced by analogy with the process of DE-AS 1 038 015. Sodium aluminate solution and sodium silicate solution are mixed to form a gel and are brought into crystalline form. Depending on the molar ratio of silicon and aluminum, various zeolites can be produced. The sorbents can then be produced by mixing and solidifying zeolites, binders and activated carbon, e.g. by granulation.

The production of amorphous aluminosilicates can take place by analogy with the process described in DE-OS 29 17 313. An aluminate solution and a silicate solution are combined. When the mixture is immediately put into a precipitation oil, bead-like bodies of amorphous aluminosilicate are formed. Activated carbon is added to one or both starting solutions for making the sorbent.

Another possibility of producing the sorbents consists in combining an (acid) aluminum sulfate solution and a silicate solution with one another and to convert them into amorphous aluminosilicate. In this case, too, activated carbon is added to one or both solutions. Beaded bodies are again obtained when the blended solutions are immediately put into a precipitation oil.

A sorbent based on amorphous $SiO_2$ is obtained by mixing activated carbon into a silicate solution and combining the same with acid solution. Alternatively, activated carbon could also be added to the acid solution. Beaded bodies are again obtained upon dropwise introduction into a precipitation oil. In addition to the activated carbon, crystalline components, such as zeolites, may be admixed.

Alternatively, amorphous oxidic materials can be coated with activated carbon, for instance, by spraying with an activated-carbon suspension in water. Of course, sorbents may be after-treated in this manner as well.

Following the production process, it is possible to take other conventional steps, such as ageing, base exchange, washing, deionizing, drying or tempering.

Especially advantageous sorbents are obtained when the precipitated oxidic material is dried after the ageing process and prior to base exchange.

Another subject matter of the present invention is an apparatus for performing the above-described process, comprising at least one adsorber (16, 19) with a charge of a sorbent, a supply line (15) which is adapted to be shut off and which leads into the adsorber for supplying the gas to be treated, and an outlet line (17) which is adapted to be shut off and used for the treated gas; a bypass which is adapted to be shut off and bridges the adsorber (16, 19) and in which the regeneration gas is guided, the bypass being connected to the supply line and the outlet line (15, 17) at respective locations between the adsorbers (16, 19) and the shut-off elements; two heat exchangers (20, 21) and a pump means which are arranged in the bypass, and a heat pump (26, 27, 28, 29) which connects the two heat exchangers (20, 21), characterized in that the sorbent comprises particulate activated carbon in an oxidic carrier.

A preferred apparatus comprises two or more adsorbers each having supply and outlet lines which are adapted to be shut off, said adsorbers being connectable to the bypass through supply lines and outlet lines which are adapted to be alternately shut off. The regeneration gas is preferably conducted in countercurrent through the adsorber(s) to be regenerated, i.e., opposite to the direction in which the gas to be treated is passed through the adsorbers.

It has turned out to be expedient to provide two further heat exchangers in the supply line of the gas to be treated in front of the adsorber. The gas to be treated is first cooled in the first heat exchanger, and material which is condensing out is separated. The material leaving this heat exchanger is heated in the second heat exchanger and passed through the adsorber. In an especially preferred embodiment these two further heat exchangers may be connected to the heat pump or another heat pump.

While the sorbents which are adapted to be used in the process of the invention are produced in the example part, the apparatus of the invention and a method of application will already be described hereinafter for the sake of simplicity:

A charge of a sorbent comprising 20% by wt. of activated carbon was used in an amorphous silicon dioxide (commercial product AK 20 of Solvay Catalysts GmbH, Hannover). The sorbent was produced according to Example 7. Solvent-containing air from a paint shop was cleaned, the main component of the waste gas being aromatic carbons, such as toluene, xylene, and compounds, such as acetone, methyl ethyl ketone and gasoline. The waste gas to be treated was first cooled via line 9 in the heat exchanger 10 and supplied to cooler 11. Components which were condensing out were discharged via line 12 from the cooler. Non-condensing components of the waste gas flow were again brought to ambient temperature via line 13 in heat exchanger 14 and were passed through line 15 into adsorber 16 with the sorbent charge. The cleaned waste gas is discharged into the environment via line 17 and fan 18. Valves 1 and 2 are open; valves 3 to 8 are closed. As soon as the adsorber 16 is charged, valves 1 and 2 are closed, valves 3 and 4 are opened, valves 7 and 8 remain closed, and valves 5 and 6 are opened for regenerating the charged adsorber 16. The gas to be treated is thus conducted via valve 3 into sorber 19 and the treated waste gas is discharged into the environment via valve 4 and fan 18. The charged adsorber 16 is regenerated with the circulated regeneration gas in the meantime. The regeneration gas is heated in heat exchanger 20 and introduced via valve 6 in countercurrent into the charged adsorber 16. The desorbate-charged regeneration gas is passed via valve 5 over the heat exchanger 21 in which it is cooled. The cooled, solvent-containing regeneration gas is introduced into cooler 22 where solvent that is condensing out is passed on via line 23 to another use. The remaining regeneration gas flow is passed via line 24 and the fan 25 into the heat exchanger 20 and is there heated again, so that the regenerating circulation can start anew. Cooling of the solvent-containing regeneration gas in the heat exchanger 21 and heating of the condensate-freed regeneration gas in the heat exchanger 20 are effected by the operating medium of a heat pump. The operating medium which leaves the heat exchanger 21 in the heated state via line 28 is compressed in compressor 26, whereby it is further heated. The cooled operating medium which leaves the heat exchanger 20 is supplied via line 29 to a throttle 27 and further cooled in throttle 27 by way of expansion. The operating medium cooled in this manner is again used in the heat exchanger 21 for cooling solvent-containing regeneration gas.

As soon as adsorber 19 is charged and adsorber 16 is regenerated, valves 1 and 2 are opened, valves 5, 3, 6 and 4 are closed, valves 7 and 8 are opened, so that adsorber 19 can be regenerated and adsorber 16 can be charged.

The following examples further explain the process of the invention.

EXAMPLES 1 TO 11

Production of activated carbon and, optionally, crystalline wide-pored $SiO_2$-containing sorbents based on amorphous $SiO_2$.

General Preparation Rule:

A sodium silicate solution containing 6.30% by wt. of $Na_2O$ and 21.16% by wt. of $SiO_2$ and having a density of $d_{20}=1.256$ was used as a source for the amorphous $SiO_2$. Activated carbon or graphite and, optionally, wide-pored $SiO_2$ (finely divided particles, pore diameter 20 to 30 Å) were added to the sodium silicate solution in the form of an aqueous suspension (mash). Precipitation was carried out by mixing with an acid solution which was an aqueous sulfuric acid having a concentration of 7.87% by wt. of $H_2SO_4$ and a density of $d_{20}=1.049$. A pH value of 6.9 was obtained upon mixing the alkaline solution and the acid solution. The mixture was immediately introduced into a precipitation oil and the resultant beads, optionally following an ageing step, were washed until they had been freed from sulfate. A base exchange was then performed, the beads being specifically contacted with 0.5% by wt. of $H_2SO_4$-containing sulfuric acid for 5 times 3 hours each. A recirculating drier was then used for drying at 180° C. with steam for 3.5 hours. Tempering was subsequently performed. Following ageing, drying was performed in Example 5 and the dried beaded bodies were subjected to a base exchange by contacting the same with sulfuric acid of a concentration of 0.5% by wt. of $H_2SO_4$ five times for 3 hours, and were then washed until freed from sulfate. Instead of sulfuric acid, 0.5% by wt. of $Al_2(SO_4)_3$ solution was used in Example 1.

EXAMPLES 12 AND 13

Beaded amorphous $SiO_2$ was used in the form of the commercial product "AF25$^R$" of Solvay Catalysts GmbH. These are beads having a diameter of from 2 to 6 mm. These beads were sprayed with an aqueous graphite suspension and then dried at 200° C. for 18 hours.

The process parameters and properties of the resultant sorbents are summarized in the following Table 1:

TABLE 1

| Example | Used Mash | Cont. of Mash [% by wt.] | Mean Part. Size [micron] (8) | Volume Ratio Mash: Water Glass | Ageing [h] | Temper. h; °C. | Vibrat. Weight [g/ml] | Pore Volume [ml/g] | Surface [m²/ml] | Bursting Pressure [kg] | Cont. of Act. Carbon or Graph. [% by wt.] |
|---|---|---|---|---|---|---|---|---|---|---|---|
| 1 | Act. Carbon (1) | 13.8 | 4.7 | 0.438 | 2 | 18/200 | | 0.91 | 817 | 2.7 | 20 |
| 2 | Graphite $SiO_2$ wide-pored | 21.4 21.4 | 8.6 4.2 | 0.375 | 2 | 18/200 | 0.53 | 0.63 | 680 | | 3 |
| 3 | Graphite $SiO_2$ wide-pored | 21.4 21.4 | 8.6 | 0.375 | 2 | 18/200 | 0.59 | | | | 11.3 |
| 4 | Act. Carbon | 16.1 | 4.8 | 0.411 | 18 | 18/200 | 0.40 | 1.01 | 675 | 1.4 | 6.4 |

TABLE 1-continued

| Example | Used Mash | Cont. of Mash [% by wt.] | Mean Part. Size [micron] (8) | Volume Ratio Mash: Water Glass | Ageing [h] | Temper. h; °C. | Vibrat. Weight [g/ml] | Pore Volume [ml/g] | Surface [m²/ml] | Bursting Pressure [kg] | Cont. of Act. Carbon or Graph. [% by wt.] |
|---|---|---|---|---|---|---|---|---|---|---|---|
| 5 | Act. Carbon (2) | 21.4 | 5.2 | 0.411 | 18 | 4/180 + 18/200 | 0.41 | 1.07 | 285 | 7.2 | 6.4 |
| 6 | Act. Carbon (2) | 15.3 | 2.8 | 0.395 | 4 | 6/200 | | 0.79 | 758 | 3.7 | 20 |
| 7 | Act. Carbon (3) | 13.0 | 2.8 | 0.464 | 4 | 6/200 | 0.49 | 0.73 | 739 | 2.9 | 20 |
| 8 | Act. Carbon (3) | 15.5 | 2.6 | 0.390 | 4 | 6/200 | 0.43 | 0.90 | 745 | 0.9 | 20 |
| 9 | Act. Carbon (4) (11) | 10.8 | 2.8 | 0.562 | 4 | 6/200 | 0.48 | 0.76 | 719 | 3.2 | 20 |
| 10 | Act. Carbon (5) (12) | 14.3 | 0.9 | 0.423 | 4 | 6/200 | | 0.95 | 592 | | 20 |
| 11 | Act. Carbon (6) | 12.1 | 1.4 | 0.500 | 4 | 6/200 | 0.52 | 0 68 | 722 | 6.9 | 20 |
| 12 | Graphite (7) (13) | 21.4 | 8.6 | (9) | — | 18/200 | 0.48 | | | | 8.0 |
| 13 | Graphite | 21.4 | 8.6 | (10) | — | 18/200 | 0.47 | | | | 4.2 |

Explanations regarding Table 1:
(1) product Lurgi AS 4/420$^R$
(2) A-Kohle Riedel 18003$^R$
(3) Norit P1$^R$, American Norit Co.
(4) Lurgi Carbopol SC 44/1$^R$
(5) Lurgi Gn-A$^R$
(6) Degussa Flammruß$^R$
(7) Norit SA 1$^R$
(8) $d_{50}$ determined according to the Cilas method
(9) finished SiO$_2$ beads, sprayed
(10) finished SiO$_2$ beads, sprayed
(11) bulk density: 0.40 g/ml
(12) bulk density: 0.45 g/ml
(13) bulk density: 0.48 g/ml

We claim:

1. A process for separating organic compounds from gases, wherein the gases to be treated are passed in at least one adsorber over a sorbent comprising a particulate activated carbon in an oxidic carrier, whereby said sorbent is charged with organic compounds and the gas freed from said organic compounds can then be discharged into the environment, the charged sorbent being regenerated by passing therethrough a heated regeneration gas heated to a temperature of from 60° C. to 80° C., the regeneration gas charged with desorbate being cooled to a temperature in the range of less than 10° C. so that organic compounds condense and can be separated, with the proviso that heating of the regeneration gas prior to passing said gas through the sorbent as well as cooling of the regeneration gas charged with desorbate are carried out by heat exchangers connected to a heat pump with heating and cooling of the regeneration gas being fully effected by said heat pump, and wherein at least one flow parameter selected from pressure, volume flow and temperature of the gas to be treated is varied as the gas is passed through the sorbent.

2. A process according to claim 1, characterized in that the regeneration gas is circulated.

3. A process according to claim 1 or 2, characterized in that at least two adsorbers (16, 19) are provided, which contain the above-mentioned sorbent and which are charged and regenerated alternately.

4. A process according to claim 1, characterized in that the regeneration carried out by passing through the regeneration gas is effected according to the countercurrent principle.

5. A process according to claim 1 wherein said sorbent comprises 0.5 to 70% by wt. of activated carbon and said oxidic carrier is based on silicon dioxide, aluminum oxide, aluminum phosphate, or aluminosilicate.

6. A process according to claim 5, wherein said sorbent comprises 0.5 to 70% by wt. of activated carbon and amorphous silicon dioxide as said carrier.

7. A process according to claim 1, characterized in that the gas to be treated is first cooled so that organic compounds condense out and can be separated, whereupon the thus precleaned gas is heated to a temperature in the range of from 60° C. to 80° C. and passed through the sorbent.

8. A process according to claim 7, characterized in that also the cooling and heating of the gas to be treated, which are carried out for the purpose of separating condensable organic compounds prior to passing the gas through the sorbent, are effected by means of the heat pump (26, 27, 28, 29) or by means of an additional heat pump.

9. A process according to claim 1, wherein the charged regeneration gas is cooled to a temperature in the range of from 0° C. to −50° C.

10. A process according to claim 1, wherein the pressure of the gas to be treated is varied in a pulsating fashion in a range from 0.5 to 1.5 atmospheres as the gas is passed through the sorbent.

11. A method according to claim 1, wherein said sorbent is contained in a device of a size through which air flows at a standard rate and the volume flow of the gas to be treated is varied in a range of from 0.5 to 1.5 times the standard air flow on the device size as the gas is passed through the sorbent.

12. A process according to claim 1, wherein said sorbent is maintained at an operating temperature and the temperature of the gas to be treated is varied in a range of from ±20° K. around the operating temperature as the gas is passed through the sorbent.

13. An apparatus for carrying out the process according to claim 1, comprising at least one adsorber (16, 19) with a charge of a sorbent, a supply line (15) which is adapted to be shut off and which leads into the adsorber for feeding the gas to be treated and an outlet line (17) which is adapted to be shut off and which is used for the treated gas; a bypass which is adapted to be shut off and which bridges the adsorber (16, 19), the regeneration gas being guided in said bypass which is connected to said supply and outlet lines (15, 17) at respective locations between the adsorbers (16, 19) and the shut-off elements; two heat exchangers (20, 21) and a pump means which are arranged in the bypass, as well as a heat pump (26, 27, 28, 29) which connects said two heat exchangers, characterized in that said sorbent comprises particulate activated carbon in an oxidic carrier.

14. An apparatus according to claim 13, characterized in that two or more adsorbers, each equipped with supply and outlet lines which are adapted to be shut off, are provided, said two or more adsorbers being adapted to be connected to said bypass with the aid of supply and outlet lines which are adapted to be shut off alternately.

15. An apparatus according to claim 13 or 14, characterized in that the two heat exchangers (20, 21) and the pump are arranged in said bypass in such a way that, during regeneration, the regeneration gas guided in said bypass is passed through the adsorber or adsorbers in countercurrent.

16. An apparatus according to claim 13, comprising two additional heat exchangers arranged before the adsorber (16, 19) in the supply line (15) of the gas to be treated.

17. An apparatus according to claim 16, characterized in that the two additional heat exchangers are connected to the heat pump (26, 27, 28, 29) or to an additional heat pump.

* * * * *